United States Patent
Neauport et al.

(10) Patent No.: US 9,671,534 B2
(45) Date of Patent: Jun. 6, 2017

(54) OPTICAL REFLECTIVE DIFFRACTION DEVICE HAVING A HIGH RESISTANCE TO LASER FLUX

(71) Applicants: Commissariat à l'énergie atomique et aux énergies alternatives, Paris (FR); CENTRE NATIONAL DE LA RECHERCHE SCIENTIFIQUE, Paris (FR)

(72) Inventors: Jérôme Neauport, Bordeaux (FR); Eric Lavastre, Salles (FR); Laurent Gallais, Pertuis (FR); Nicolas Bonod, La Londe les Maures (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 24 days.

(21) Appl. No.: 14/378,638

(22) PCT Filed: Feb. 20, 2013

(86) PCT No.: PCT/EP2013/053323
§ 371 (c)(1),
(2) Date: Aug. 13, 2014

(87) PCT Pub. No.: WO2013/124289
PCT Pub. Date: Aug. 29, 2013

(65) Prior Publication Data
US 2015/0029589 A1    Jan. 29, 2015

(30) Foreign Application Priority Data
Feb. 21, 2012 (FR) ..................... 12 51570

(51) Int. Cl.
*G02B 5/18* (2006.01)
*G02B 1/10* (2015.01)
*H01S 3/00* (2006.01)

(52) U.S. Cl.
CPC .......... *G02B 5/1861* (2013.01); *G02B 1/105* (2013.01); *G02B 5/1866* (2013.01); *G02B 5/1814* (2013.01); *H01S 3/0057* (2013.01)

(58) Field of Classification Search
CPC ... G02B 5/1814; G02B 5/1819; G02B 5/1866
(Continued)

(56) References Cited

U.S. PATENT DOCUMENTS 5,907,436 A * 5/1999 Perry ................... G02B 5/1814
359/569
8,238,025 B2 * 8/2012 Parriaux ............. G02B 5/1819
359/486.01
(Continued)

FOREIGN PATENT DOCUMENTS

EP  0 626 597 A1  11/1994
FR  2 921 498 A1  3/2009

OTHER PUBLICATIONS

Optimization design of an ultrabroadband high-efficiency all-dielectric grating, Optics Letters vol. 35, No. 2 Jan. 15, 2010, pp. 187-189.*
(Continued)

*Primary Examiner* — Audrey Y Chang
(74) *Attorney, Agent, or Firm* — Nixon Peabody, LLP; Khaled Shami (57) ABSTRACT

The present invention relates to an optical device for reflective diffraction with high diffraction efficiency and high laser flux resistance. The device includes a protective structure having at least one mixture layer produced by a uniform mixture of a first material and of a second material, where
(Continued)

both of these are dielectric, and wherein said first material has an optical index lower than that of the said second material.

7 Claims, 5 Drawing Sheets

(58) Field of Classification Search
USPC .................. 359/569, 576, 586, 572; 385/37
See application file for complete search history.

(56) References Cited

U.S. PATENT DOCUMENTS

2009/0059375 A1    3/2009   Hoose
2010/0202057 A1*   8/2010   Neauport ............... B82Y 20/00
                                                       359/572

OTHER PUBLICATIONS

Shijie Liu et al., "Characteristics of high reflection mirror with an SiO2 top layer for multilayer dielectric grating; Characteristics of high reflection mirror". Journal of Physics D. Applied Physics, IOP Publishing, Bristol, GB, vol. 40, No. 10, May 21, 2007, pp. 3224-3228.
Hongbo Wei et al., "All-dielectric reflection gratings: a study of the physical mechanism for achieving high efficiency", Applied Optics, vol. 42, No. 31, Nov. 1, 2003, pp. 6255-6260.
Nicolas Bonod et al., "Design of diffraction gratings for pultipetawatt laser compressors", SPIE, PO Box 10 Bellingham WA 98227-0010 USA, vol. 5962, Jan. 1, 2005, pp. 59622M-1.
Jianpeng Wang et al., "Design and analysis of broadband high-efficiency pulse compression gratings", Applied Optics, Optical Society of America, Washington, dc; US, vol. 49, No. 16, Jun. 1, 2010, pp. 2969-2978.
M. Jupé et al., "Improvement in laser irradiation resistance of fs-dielectric optics using silica mixtures", Proceedings of SPIE, vol. 6403, Oct. 11, 2006, pp. 64031A-1 thru 64031A-11.
International Search Report and Written Opinion in PCT/EP2013/053323, European Patent Office, Rijswijk, NL, mailed May 21, 2013.
Neauport et al., entitled "Effect of electric field on laser induced damage threshold of multilayer dielectric gratings", 2007, Opt. Express, vol. 15, No. 19, 12508.
Mero et al., entitled "Scaling laws of femtosecond laser pulse induced breakdown in oxide films", 2005, Phys. Rev. B, 71, 115109.
Jupé et al., entitled "Laser Induced Damage in Gradual Index Layers and Rugate Filters", 2006, SPIE Digital Library.

* cited by examiner

OPTICAL REFLECTIVE DIFFRACTION DEVICE HAVING A HIGH RESISTANCE TO LASER FLUX

CROSS-REFERENCE TO RELATED PATENT APPLICATIONS

The present application is a National Stage Application of International Application No. PCT/EP2013/053323 entitled "OPTICAL REFLECTIVE DIFFRACTION DEVICE HAVING A HIGH RESISTANCE TO LASER FLUX" filed Feb. 20, 2013, which claims priority to French Patent Application Number 1251570 filed Feb. 21, 2012, the contents of which are incorporated herein by reference in their entirety.

TECHNICAL FIELD

The present invention relates to the general field of optical devices for reflective diffraction of an incident light beam.

STATE OF THE PRIOR ART

Figure 1:
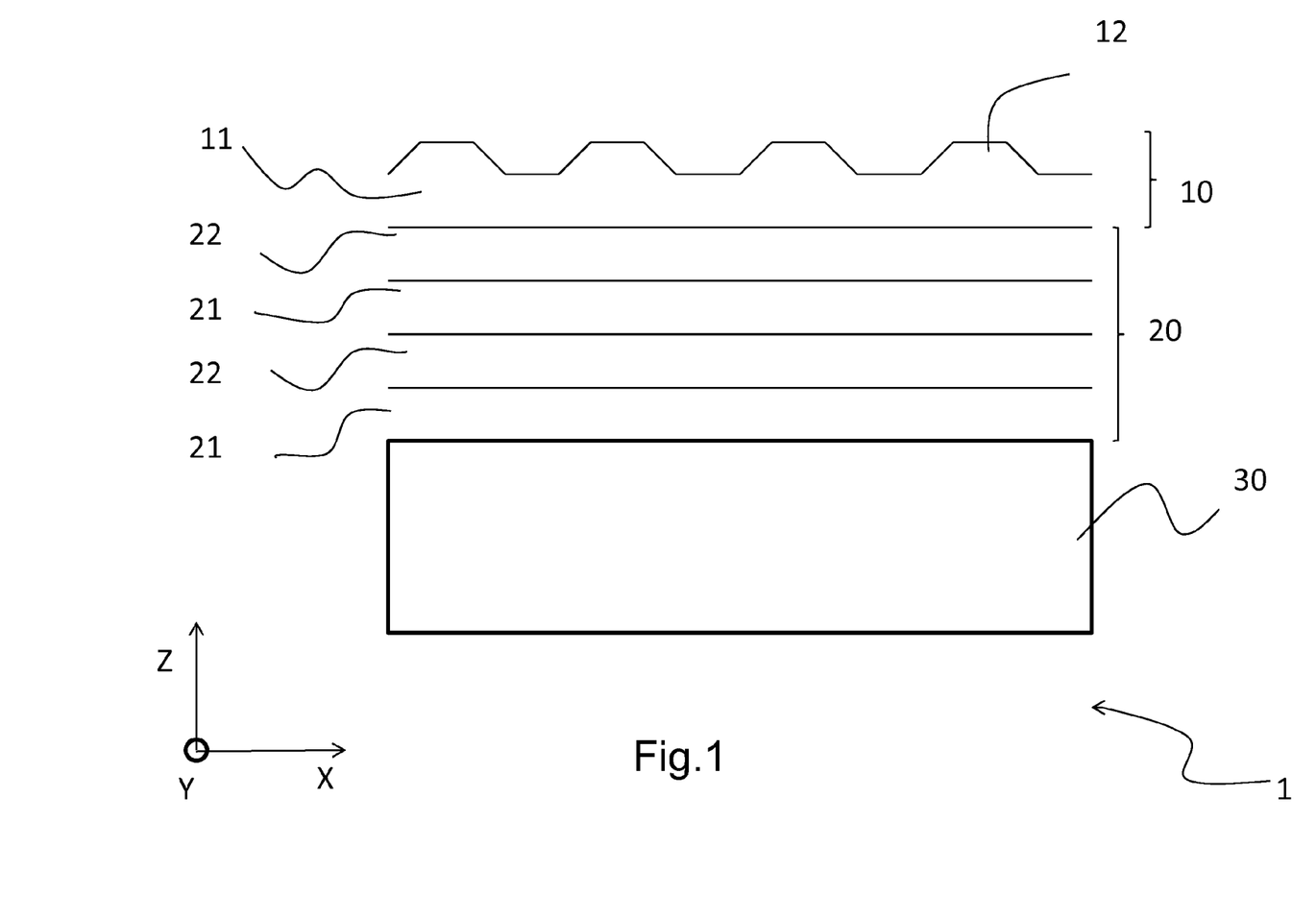
FIG. 1 is a diagrammatic view of an optical device for reflective diffraction according to an example of the prior art.

Throughout the following description, by convention a direct orthonormal Cartesian coordinate system (X, Y, Z) is used, as represented in FIG. 1. Directions X and Y are aligned with the length and width of the optical device, and direction Z is aligned with its thickness.

Reflective diffraction gratings are used to obtain a short-pulse laser, i.e. one with pulses having a duration of the order of one picosecond to one femtosecond.

Obtaining this type of pulse presents a number of difficulties.

In particular, it is not possible to amplify a pulse directly without generating non-linear effects which impair the time and space characteristics of the beam, and which can damage the amplifying materials.

The method called "chirped pulse amplification" enables this disadvantage to be prevented.

This method consists initially in time-stretching the pulse such that the pulse's duration is increased and its power reduced. The pulse is then amplified by propagation in an amplifying material such as, for example, a sapphire crystal doped with titanium ($Ti^{3+}$:$Al_2O_3$). Finally the pulse is time-compressed so as to regain its initial duration.

The stretching and compressing systems habitually used are optical devices having a diffraction grating positioned directly on a reflective structure with multiple layers.

The use of increasingly efficient high-power lasers is leading laser flux resistance to being considered an essential specification of the optical devices.

As an example, the PetaWatt laser called PETAL delivers a pulse of several kilojoules in a fraction of a picosecond, for example 500 fs, and has a power of the order of 1015 Watt.

The laser flux resistance of an optical device can be defined as the resistance threshold of the materials comprising the device at a certain energy density of the laser. A high laser flux resistance of an optical device then denotes the propensity of this device not to be subject to more or less substantial irreversible effects when the laser's energy density is increased to high energy values. The irreversible effects are, for example, fusion, vaporisation, or alternatively delamination of the layers of the optical device. Crazings, cracking, splintering or craters can also appear in the layers. These modifications of the optical materials which comprise the optical device are defined as the laser damage.

The reflective structure is generally produced by a stack of thin single-dielectric material layers, produced alternately from a first dielectric material having a first optical index, and a second dielectric material having a second optical index different from the first. The optical thickness of the layers of the stack is of the order of either one quarter or one half the wavelength, so as to guarantee maximum reflectivity at the wavelength of the pulse.

The term "thin layer" is understood to mean an optical layer the thickness of which, which is defined as the distance along the optical path, is small relative to its length and width dimensions. The thickness is habitually between several nanometers and several hundred nanometers.

U.S. Pat. No. 5,907,436 describes the example of an optical reflective diffraction device 1 including a diffraction grating 10 positioned directly on a reflective structure 20 including a stack of single-material thin layers, as described above.

FIG. 1 represents diagrammatically one of the embodiments described in patent U.S. Pat. No. 5,907,436.

More specifically, reflective structure 20 is a multi-layer structure consisting of a stack of thin layers 21, 22; where each is made of a dielectric material having an optical index nL and nH respectively, where nL<nH. By this means the regular alternation of the layers enables an optical index to be obtained the value of which alternates between nL and nH, going in the direction of the thickness of reflective structure 20. The variation of the index going in the direction of the thickness is calculated to optimise reflection efficiency for the device.

A diffraction grating 10 is etched in a dielectric layer 11 deposited on reflective structure 20. More specifically, reflective structure 20 is deposited on a substrate 30. Finally, a periodic arrangement of patterns 12 is etched on dielectric layer 11.

The advantage of such a multi-layer reflective structure is that it makes it possible to obtain, ultimately, in combination with a diffraction grating positioned at its surface, a reflective diffraction device having adjustable efficiency and bandwidth. Indeed, it is easy to predefine the configurations of the multi-layer structure for a given optical application by modifying the thickness, the materials or the number of thin layers.

Conversely, having a large number of thin layers stacked on top of one another necessarily causes high mechanical stresses at the interfaces between two thin layers of the stack. The mechanical stresses are in particular a consequence of the different physical natures of the materials deposited alternately. If these stresses are too great they can lead to mechanical rupture of the device" (crazing) when it is operated in a vacuum.

In addition, a stack of thin layers etched in this manner contributes to reducing the laser flux resistance, and therefore to lowering the overall damage threshold of an optical system.

Research undertaken on laser flux resistance of optical devices, such as the research described in detail in the article of Neauport et al., entitled "Effect of electric field on laser induced damage threshold of multilayer dielectric gratings", 2007, Opt. Express, Vol. 15, No. 19, 12508, shows that the short-pulse damage threshold of an optical device is related to the square of the modulus of the electric field in the said device. It will then be understood that the presence of many interfaces in the reflective structure can lead to a substantial lowering of the damage threshold of the optical device.

Different solutions have been proposed to reduce the stresses and to reduce the modulus of the electric field in the reflective structure.

A first solution consists in limiting the number of thin layers in the stack, and consequently the number of interfaces. To this end it is sought to design alternating thin layers made of dielectric materials having a substantial difference of optical index in order to maximise reflection in the multi-layer structure.

However, as shown by the article of Mero et al., entitled "Scaling laws of femtosecond laser pulse induced breakdown in oxide films", 2005, Phys. Rev. B, 71, 115109, the highest damage thresholds are obtained for dielectric materials having the lowest optical indices.

This solution is therefore disadvantageous, since the raising of the overall damage threshold of the reflective diffraction device obtained by reducing the number of layers is therefore counterbalanced by the presence of dielectric materials having a high optical index.

Another solution, which is currently subject to much research, consists in using layers with a gradual index. These layers, called gradual index mixture layers, are produced by an inhomogenous mixture of materials of different optical indices.

The term "inhomogenous" is understood to mean that the proportion of chemical components which constitutes the layer is not the same at all points of the layer, depending on its thickness.

The term "gradual index" is understood to mean that the composition of the mixture varies continuously according to its thickness.

The term "mixture layer" is understood to mean a layer including or formed of the local association of at least two dielectric materials, without any chemical reaction between the said materials.

A mixture layer has an optical index and a damage threshold which are intermediate between those of the dielectric materials contained in the said layer.

The proportions of the materials in the mixture can then be defined in order to limit the inhomogeneities of materials at the interfaces between the layers. This is equivalent to causing the optical index to be varied continuously and regularly, and not in a sudden manner, at the transition between two uniform layers made of different materials.

It is then possible to eliminate the interfaces by designing the reflective structure in the form of a single mixture layer, the proportion of materials of which varies continuously depending on its thickness.

By proceeding in this manner for one or for all the layer(s) of the stack of the dielectric structure it then becomes possible to limit the electric field variations in the reflective structure.

Recent studies, for example the one described in the article of Jupé et al., entitled "Laser Induced Damage in Gradual Index Layers and Rugate Filters", 2006, SPIE Digital Library, have put forward certain promising results in raising the damage threshold through such structures.

However, one of the main difficulties in producing such structures lies in the fact that the optical index of the reflective structure must vary regularly in order to ensure maximum reflectivity at the wavelength of the pulse. This implies that the materials proportion of the mixture at a first thickness of the reflective structure must be the same at a second thickness, separated by a distance of the order of one quarter or one half of the wavelength of the first thickness.

Despite the precision provided by certain deposition techniques, such as reactive sputtering or ion beam assisted deposition, practical production of such structures is currently not effectively implemented.

In light of the problems encountered in the solution is described above, the goal of the present invention is to propose an optical reflective diffraction device with high diffraction efficiency and high laser flux resistance, and which is easy to produce.

DESCRIPTION OF THE INVENTION

This goal is attained by an optical device for reflective diffraction of an incident light beam. In the first embodiment of the invention, this embodiment is characterised in that it includes a diffraction grating consisting of a dielectric layer in which a periodic arrangement of patterns is etched, where the said dielectric layer is deposited on a protective structure, which is itself deposited on a thin dielectric layer made of a first dielectric material of a reflecting structure including a stack of thin dielectric layers made alternately of a first dielectric material and of a second dielectric material, where the first material has an optical index which is lower than that of the second material, where the said protective structure includes at least one mixture layer produced by a homogenous mixture of the said first and second dielectric materials, and where the optical index of the said first mixture layer is higher than that of the said first dielectric material.

As a variant of the first embodiment, the optical device for reflective diffraction of an incident light beam is characterised in that the said protective structure includes the said first mixture layer deposited on an intermediate dielectric layer made of the said first dielectric material, where the said intermediate dielectric material is deposited on a second mixture layer produced by a homogenous mixture of the said first and second dielectric materials, and where the optical index of the said second mixture layer is higher than that of the said first dielectric material.

According to a second embodiment, the optical device for reflective diffraction of an incident light beam is characterised in that it includes a protective structure deposited on a thin dielectric layer made of a first dielectric material of a reflecting structure including a stack of thin dielectric layers made alternately of a first dielectric material and of a second dielectric material, where the said first dielectric material has an optical index lower than that of the said second dielectric material,
where the said protective structure includes at least one first mixture layer produced by a homogenous mixture of the said first and second dielectric materials, where the optical index of the said first mixture layer is higher than that of the said first dielectric material, and where a periodic arrangement of patterns is etched on the free surface of the said protective structure so as to form a diffraction grating.

As a variant of the second embodiment, the optical device for reflective diffraction of an incident light beam is characterised in that the said protective structure includes the said first mixture layer deposited on an intermediate dielectric layer made of the said first dielectric material, where the said dielectric intermediate layer made of the said first dielectric material is deposited on a second mixture layer (143) produced by a homogenous mixture of the said first and second dielectric materials, where the said periodic arrangement of patterns is etched on the free surface of the said first mixture layer, and where the optical index of the said second mixture layer is higher than that of the said first dielectric material.

Advantageously, the first dielectric material is SiO2, and the second dielectric material is HfO2.

The first mixture layer (141, 141') preferably contains at least 5% SiO2. Similarly, the second mixture layer preferably contains at least 5% $SiO_2$.

The optical device for reflective diffraction of an incident light beam can include a substrate on which the said reflecting structure rests.

This substrate can be metallic. As a variant, the device according to the invention includes a layer of a metal material, positioned between the said reflecting structure and the said substrate.

BRIEF DESCRIPTION OF THE ILLUSTRATIONS

Embodiments of the invention will now be described, as non-restrictive examples, with reference to the appended illustrations, in which.

DETAILED ACCOUNT OF A PREFERRED EMBODIMENT

The idea underlying the invention is to integrate, in an optical device for reflective diffraction including a diffraction grating and a reflecting structure, a protective structure which enables the overall damage threshold of the optical device to be raised.

An optical device for reflective diffraction including such a protective structure has high diffraction efficiency and high laser flux resistance. In addition, the protective structure is designed such that it can easily be removed from the multi-layer reflecting structure.

More specifically, the optical diffraction device includes, in succession in the direction of the path of an incident light beam penetrating into the device:
a diffraction grating,
a protective structure,
a reflecting structure.

The diffraction grating can be produced in two different ways. It can be etched on a dielectric layer deposited directly on the protective structure, or alternatively be etched directly on the protective structure. These two options constitute the two embodiments of the invention which will be described in relation with FIGS. 2 to 5.

For purposes of conciseness, the remainder of the description describes only the technical characteristics common to the different embodiments of the invention.

The reflecting structure is formed of a stack of single-material dielectric thin layers made alternately of a first dielectric material and of a second dielectric material. The single-material layers of the reflective structure all have roughly the same thickness.

This thickness is small compared to the length and width dimensions of the layers, which are of the order of several nanometers to several hundreds of nanometers.

The optical thickness of the single-material dielectric thin layers is of the order of either one quarter or one half the wavelength of the incident light beam, so as to guarantee maximum reflectivity at the wavelength of the pulse.

Different materials are chosen for the first and second dielectric materials, such that they have optical indexes and damage thresholds which differ.

The first dielectric material is a material which has an optical index lower than that of the second dielectric material. The two materials will be chosen such that the optical index difference between the two materials is substantial, to minimise the number of thin layers, and therefore to reduce the number of interfaces in the reflecting structure.

The single-material thin layers made of the first and of the second dielectric materials of the reflecting structure can be produced by known techniques of physical vapour deposition such as, for example, cathodic sputtering, IBS (Ion Beam Sputtering), evaporation, or EBPVD (Electron Beam Physical Vapour Deposition).

The known techniques of chemical vapour deposition such as, for example, ALD (Atomic Layer Deposition) can also be used, together with the known techniques known as hybrid techniques such as, for example, IBAD (Ion Beam Assisted Deposition). The technique known as sol-gel deposition can also be used.

The protective structure, for its part, can include multiple thin layers or a single thin layer. In all cases it includes at least one mixture layer produced by a homogenous mixture of the first and second dielectric materials used as materials for the single-material thin layers of the reflecting structure.

The protective structure is such that its first layer reached by an incident light beam is a mixture layer. Consequently, according to the embodiments of the invention, the dielectric grating is either etched directly on a mixture layer of the protective structure, or is etched on a dielectric layer deposited directly on a mixture layer of the protective structure.

The deposition methods used to produce the mixture layer(s) of the protective structure are implemented such that the mixture in these layers is homogenous. Production of a homogeneous mixture layer is a technique which is currently perfectly controlled.

In order to clarify what is meant by a homogenous mixture layer, it is recalled that the concentrations of the first dielectric material and of the second dielectric material are uniform at all points in the mixture layer. The mixture layer consequently has an optical index and a damage threshold which are intermediate between these first and second dielectric materials, and which are constant at all points in the mixture layer.

The optical index of the mixture layer is then obtained as a linear combination of the optical indices of the mixture materials, weighted by their relative proportions.

The damage threshold of the mixture layer for a certain proportion of materials is, for its part, obtained by experimental measurements. Its value depends, indeed, on complex electrical phenomena, notably interactions in the electron bands between the atoms of the materials constituting the mixture.

It is then possible, using measurements made under precise conditions, to define a table of correspondence between proportions of materials in the mixture and the damage thresholds of the mixture layer measured for these proportions.

Each mixture layer of the protective structure is preferably deposited by Ion Beam Sputtering (IBS) from at least two targets, one for each of the said dielectric materials forming the mixture layer. These materials are sputtered simultaneously, but with sputtering rates specific to each of the said materials, where the sputtering rate of each source of dielectric material is constant over time, in order that a uniform mixture is obtained.

It should be noted that the deposition techniques mentioned above with reference to the single-material thin layers can also be used.

Example embodiments of mixture layers 22 can also be found in the work of MacLeod entitled "Thin-Film Optical Filters", 2001, Edition Taylor & Francis, chapter nine "Production methods and thin-film materials".

With such deposition methods it is understood that it is easy to define the proportion of each of the materials constituting a mixture layer in order to adapt it to a particular application, and in particular to the various embodiments of the invention described below.

The proportions of first dielectric material and of second dielectric material can therefore be defined so as to obtain a certain damage threshold and a precise optical index.

In order to guarantee optimum reflection efficiency, the thin layers of the protective structure and of the reflective structure are arranged and configured such that two consecutive thin layers in the direction of the thickness of reflecting structure 20 have different optical indices. The variation of the optical index is calculated to optimise reflection efficiency for the device.

It is then understood that the proportions of the materials of a uniform mixture layer of the protective structure are defined so as to obtain a uniform mixture layer having an optical index value different to that of the single-material thin layer on which it is deposited.

Thus, when a uniform mixture layer of the protective structure is deposited on a single-material thin layer made of a first dielectric material, the proportions of the materials of the mixture layer are then defined such that the optical index of the mixture layer is higher than that of the first dielectric material. The mixture layer then has a damage threshold higher than the single-material thin layers made of a second dielectric material, and the alternation of the value of the optical index between each layer is maintained, by this means giving the device optimum reflection efficiency. Such a mixture layer is a layer with high laser flux resistance.

The thin layers of the protective structure, and in particular the upper layer of the protective structure when it is not etched to form a diffraction grating, and the thin layers of the reflecting structure are advantageously of roughly the same thickness. Their optical thickness is preferentially of the order of either one quarter or one half the wavelength, so as to guarantee maximum reflectivity at the wavelength of the pulse.

The thin layers of the protective structure, and in particular the upper layer of the protective structure when it is not etched to form a diffraction grating, and the thin layers of the reflecting structure, form a structure with high reflection efficiency and high laser flux resistance.

It is then understood that when a diffraction grating is installed on such a structure an optical device for reflective diffraction is obtained with high diffraction efficiency and high laser flux resistance.

The first and second dielectric materials are chosen from oxides such as SiO2, HfO2, TiO2, Al2O3, Nb2O3, Ta2O4-5, Sc2O3, ZrO2, from fluorides such as PbF2, CeF2, LaF3, ThF4, YF3, MgF2, Na3AlF6, CaF2, BaF2, from sulphides such as ZnS, or from selenides such as ZnSe.

Preferably the first material will be SiO2 and the second material will be HfO2.

Indeed, in light of their optical indices, SiO2 and the HfO2 materials have flux resistances which are among the highest in the literature, as is shown as an illustration by table 1 below. Table 1 gives optical index n and damage threshold F of a single-material thin layer subjected to a laser pulse of wavelength 800 nm, of duration of 500 fs and with incidence 0°, for several examples of dielectric oxides.

TABLE 1

| Material | n | F(J/cm$^2$) |
| --- | --- | --- |
| SiO$_2$ | 1.50 | 4.7 |
| Al$_2$O$_3$ | 1.65 | 3.1 |
| HfO$_2$ | 2.09 | 2.6 |
| Ta$_2$O$_5$ | 2.17 | 1.5 |
| TiO$_2$ | 2.39 | 1.0 | where n is the optical index and F the damage threshold in J/cm$^2$.

For a first material made of SiO2 and a second material made of HfO2, table 2 shows characteristics of mixture layers measured for different proportions of materials.

TABLE 2

| % HfO$_2$ | % SiO$_2$ | n | F (J/cm$^2$) |
| --- | --- | --- | --- |
| 100 | 0 | 2.03 | 2.66 |
| 87 | 13 | 1.96 | 2.73 |
| 79 | 21 | 1.92 | 2.81 |
| 60 | 40 | 1.81 | 3.11 |
| 44 | 56 | 1.72 | 3.34 |
| 29 | 71 | 1.64 | 3.77 |
| 23 | 77 | 1.6 | 3.91 |
| 10 | 90 | 1.53 | 4.3 |
| 3 | 97 | 1.49 | 4.62 |
| 0 | 100 | 1.47 | 5.02 |

Damage threshold F of the uniform mixture layer for the different proportions of materials has been measured according to standard NF EN ISO 11254-1 for a laser pulse of wavelength 1030 nm, of duration 500 fs, and for an angle of incidence of 0°.

The reflecting structure can rest on a substrate forming a support. The substrate can be made of a reflecting material or one which is transparent to the wavelength of the incident light beam. The substrate can, for example, be made of glass, a semiconductor material, silica glass, sapphire or a ceramic material.

The substrate can also be covered with a metal layer, for example gold, with the aim of increasing further the reflective rate of the optical device. More specifically, a metal layer can be included between the substrate and the reflecting structure.

In a variant environment of the device according to the invention the substrate is metallic.

The two embodiments of the invention will be described in relation with FIGS. 2 to 5. It will be considered in the remainder of the description that the first material is SiO$_2$ and that the second dielectric material is HfO$_2$. This choice of the first and second dielectric materials is not restrictive, and the conclusions made in the remainder of the description would be valid for other first and second dielectric materials, as defined above.

In FIGS. 2 to 5 the substrate on which the reflecting structure is deposited is noted 130.

Figure 2:
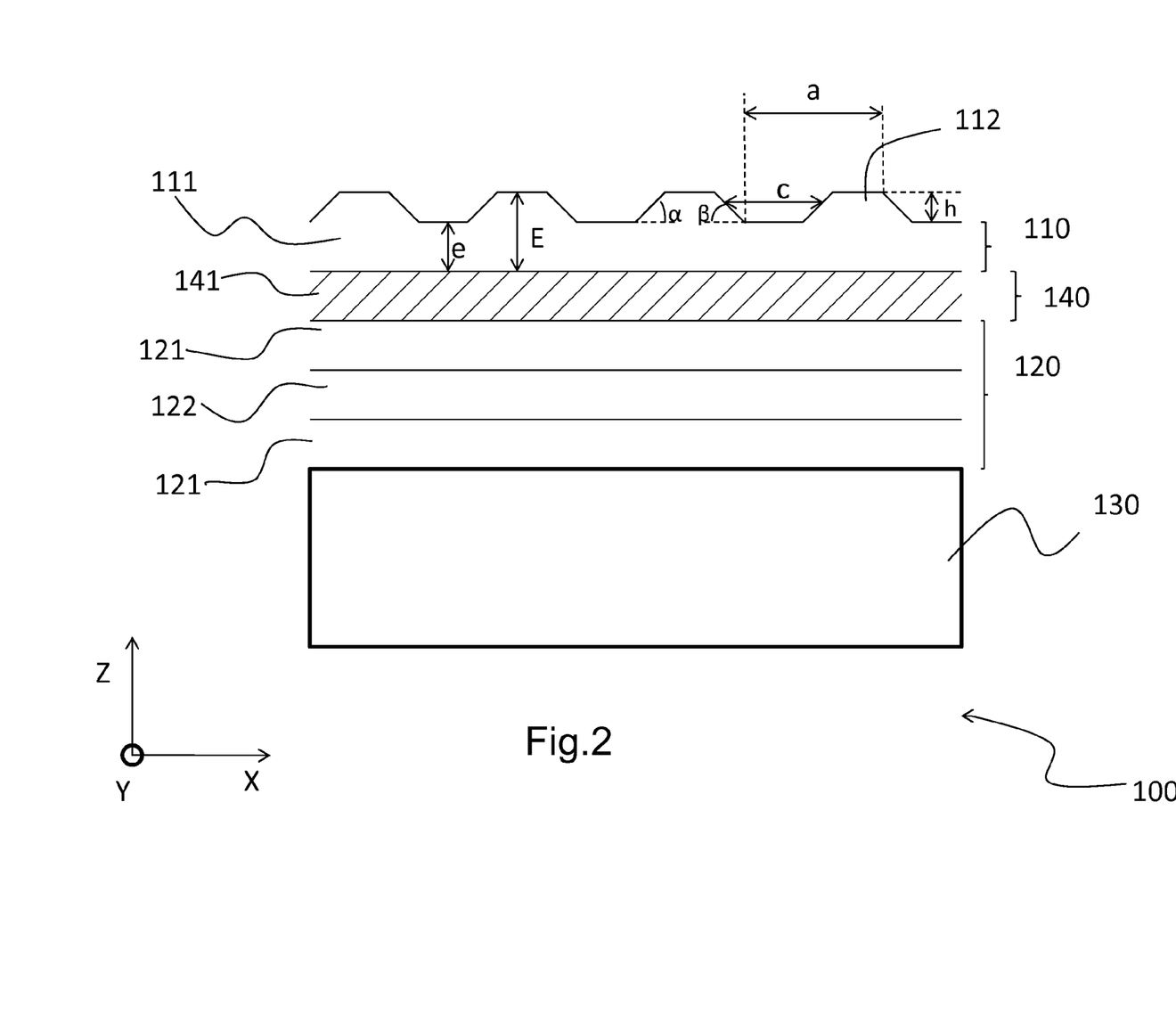
FIG. 2 is a schematic cross-section view of an optical device for reflective diffraction according to a first embodiment of the invention.

FIG. 2 represents the optical device for reflective diffraction 100 according to a first embodiment of the invention.

More specifically, diffraction grating 110 consists of a dielectric layer 111 in which a periodic arrangement of patterns 112 is etched. This dielectric layer 111 is deposited on a mixture layer 141 of protective structure 140, for example by deposition techniques relative to the single-material thin layers of the reflecting structure.

Etched dielectric layer 111 is a uniform layer made of a single material. Etched dielectric layer 111, which is then the first layer of the device reached by an incident ray, is made of a material having a high damage threshold, in order to prevent it being damaged by laser pulses. Etched dielectric layer 111 is advantageously made of $SiO_2$.

Periodic arrangement 112 of patterns can be a succession of stripes or lines of period a and of thickness h.

The term "periodic patterns" is understood to mean a spatial variation in direction Z and a periodic variation in plane (X,Y) of an area intended to receive the incident beam.

Patterns 112 represented in FIGS. 2 to 5 are trapezoid. The width of the furrows, defined at mid-height, is noted c, the base of the trapezia forms angles noted α and β with plane (X,Y), and the thickness of the unetched dielectric layer of the dielectric grating is noted e.

Periodic patterns 112 are etched in etched dielectric layer 111 using known methods of holography and/or ionic etching, or diamond etching. A method of deposition through a mask having the desired periodic patterns can also be used.

In this first embodiment, protective structure 140 has only one layer, namely a uniform mixture layer 141. This layer has roughly the same thickness as single-material thin layers 121, 122 of reflecting structure 120.

Uniform mixture layer 141 is deposited by one of the deposition techniques described above, on a single-material thin layer made of SiO2.

To maximise reflection efficiency, and therefore to have the regular alternation of the value of the optical index with each change of layer, mixture layer 141 has an optical index which is higher than that of a single-material layer 121 made of SiO2. Mixture layer 141 is preferably made such that the mixture includes a proportion of $SiO_2$ at least equal to 5%, and consequently a proportion of $HfO_2$ at most equal to 95%.

An example of this first embodiment will now be described.

Diffraction grating 110 includes a single-material dielectric layer 111 made of $SiO_2$ on which trapezoid patterns 112 arranged in periodic fashion are present.

Patterns 112 are 390 nm thick and have angles α=β=83°. The interval of the grating is 1780 patterns per millimeter.

Thickness E of the unetched portions of dielectric layer 111 is 600 nm. The optical index of this layer is 1.50.

Mixture layer 141 directly in contact with reflecting structure 120 is 255 nm thick. Mixture layer 141 consists of a uniform mixture of 23% $HfO_2$ and 77% $SiO_2$. It has an optical index of 1.6 which is roughly constant at all points in the said layer.

Each of the said single-material thin layers 121 made of $SiO_2$ is 155 nm thick. The optical index of $SiO_2$ is 1.50.

The single-material thin layers 122 made of HfO2 are 255 nm thick. The optical index of $HfO_2$ is 2.09.

Reflecting structure 120 positioned between mixture layer 141 and substrate 30 includes a first thin layer 121 made of $SiO_2$, in contact with mixture layer 141, followed by two pairs of $HfO_2/SiO_2$ thin layers.

Finally, reflecting structure 20 includes a fine gold layer (not represented) and is lying on a substrate 30.

Thin dielectric layers 121, 122, 141 of optical device 100 have the following damage thresholds, with regard to a laser pulse of wavelength 1053 nm and a duration of 500 fs, with TE polarisation, and angle of incidence 0°:5.02 J/cm² for single-material thin layer 121 made of SiO2, 2.66 J/cm2 for single-material thin layer 122 made of HfO2 and 3.91 J/cm² for mixture layer 141. It should be noted that these damage thresholds are measured according to standard NF EN ISO 11254-1.

Such an optical device 100 has a diffraction efficiency in order −1 which is roughly equal to 99%.

It should thus be noted that mixture layer 141 has an optical index ($n_M$=1.6) close to that of a single-material layer made of $Al_2O_3$ ($n_{Al2O3}$=1.65), but a higher damage threshold ($F_M$~3.91 J/cm² compared to $F_{Al2O3}$~3.1 J/cm²).

Optical device 100 according to this example embodiment then has a particularly high global damage threshold, meaning that the required number of thin dielectric layers can be limited.

Figure 3:
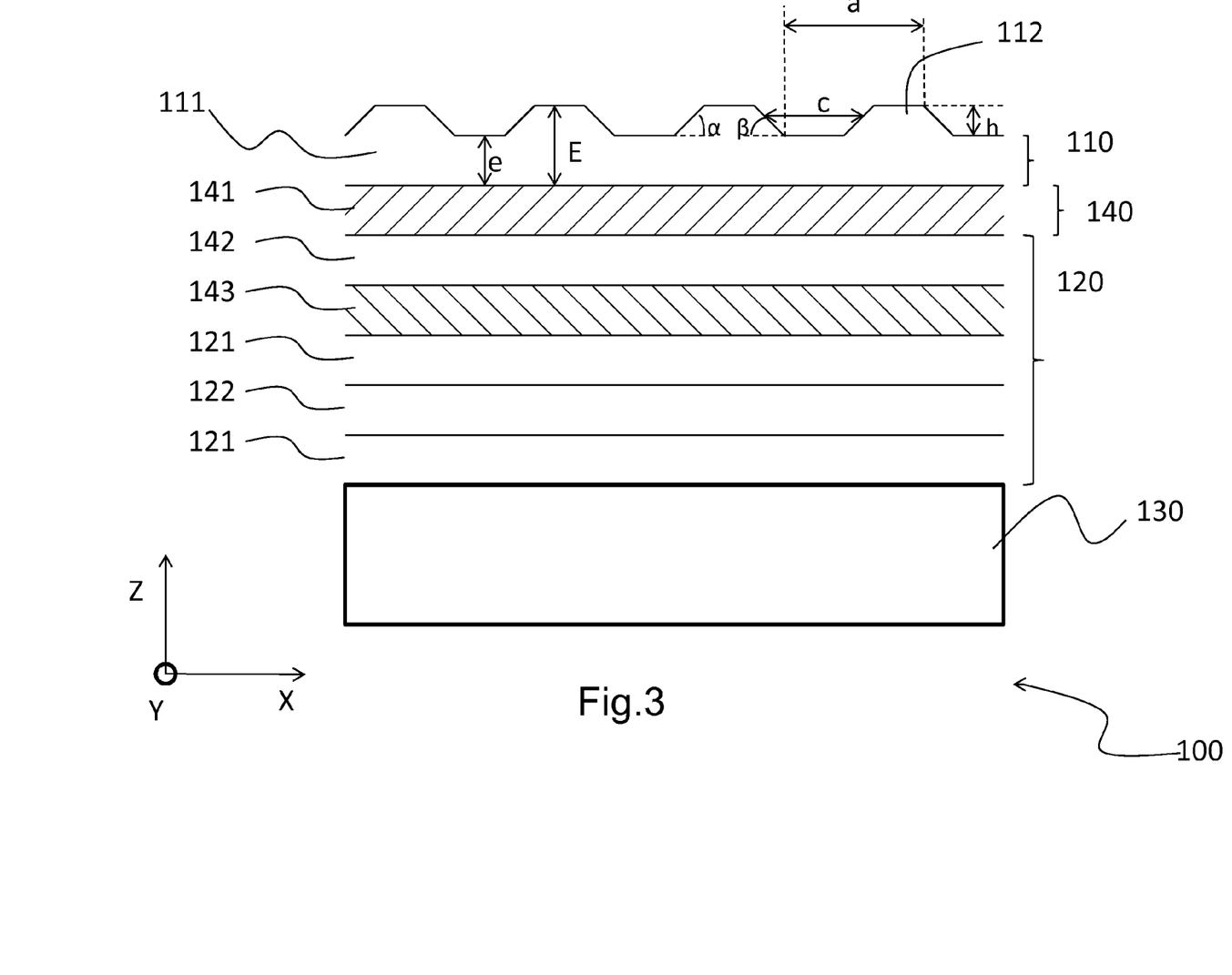
FIG. 3 is a schematic cross-section view of an optical device for reflective diffraction according to a variant of the first embodiment of the invention.

A first variant of this first embodiment is illustrated in FIG. 3.

According to this variant, protective structure 140 includes a second mixture layer 143 deposited on a layer 121 made of $SiO_2$ of reflecting structure 120. A dielectric intermediate thin layer 142 made of $SiO_2$ is deposited on second mixture layer 143. Finally, a first mixture layer 141 is deposited on this intermediate dielectric layer 142. Intermediate dielectric layer 142 is, for example, formed by the deposition techniques used for the thin layers of reflecting structure 120.

To maximise reflection efficiency, and therefore to have the regular alternation of the value of the optical index with each change of layer, mixture layer 141 and mixture layer 143 have optical indices which are higher than that of a single-material layer 121 made of SiO2.

Mixture layer 141 and mixture layer 143 are preferably made such that the mixture includes a proportion of $SiO_2$ at least equal to 5%, and consequently a proportion of $HfO_2$ at most equal to 95%.

For example, mixture layer 141 can consist of a uniform mixture of 23% $HfO_2$ and 77% $SiO_2$, and have an optical index of $n_{M1}$~1.6 which is roughly constant at all points of the said layer, and be 255 nm thick.

Mixture layer 143 can consist of a uniform mixture of 60% $HfO_2$ and 40% $SiO_2$, and have an optical index of $n_{M2}$~1.81 which is roughly constant at all points of the said layer, and be 255 nm thick.

In this case, thin layers 141 and 143 have the following damage thresholds, with regard to a laser pulse of wavelength 1053 nm and a duration of 500 fs, with TE polarisation, and angle of incidence 0°:3.91 J/cm² for mixture layer 141 and 3.11 J/cm² for mixture layer 143. It should be noted that these damage thresholds are measured according to standard NF EN ISO 11254-1.

Mixture layers 141, 143 therefore have at once suitable optical indices and high damage thresholds. The high thresholds of the mixture layers thus give optical device 100 according to this variant of the first embodiment a particularly high global damage threshold. According to this variant of the first embodiment, the protection against laser flux provided by protective structure 140 is at once improved by the presence of the two mixture layers 141, 143 having a high damage threshold and optical index said to be high, but also by the presence of dielectric intermediate thin layer 142, made of $SiO_2$, inserted between the two mixture layers.

Furthermore, it will be understood that according to the variant which has just been described, protective structure 140 is able to include multiple mixture layers, where a single-material intermediate layer made of $SiO_2$ is inserted between two uniform mixture layers.

Figure 4:
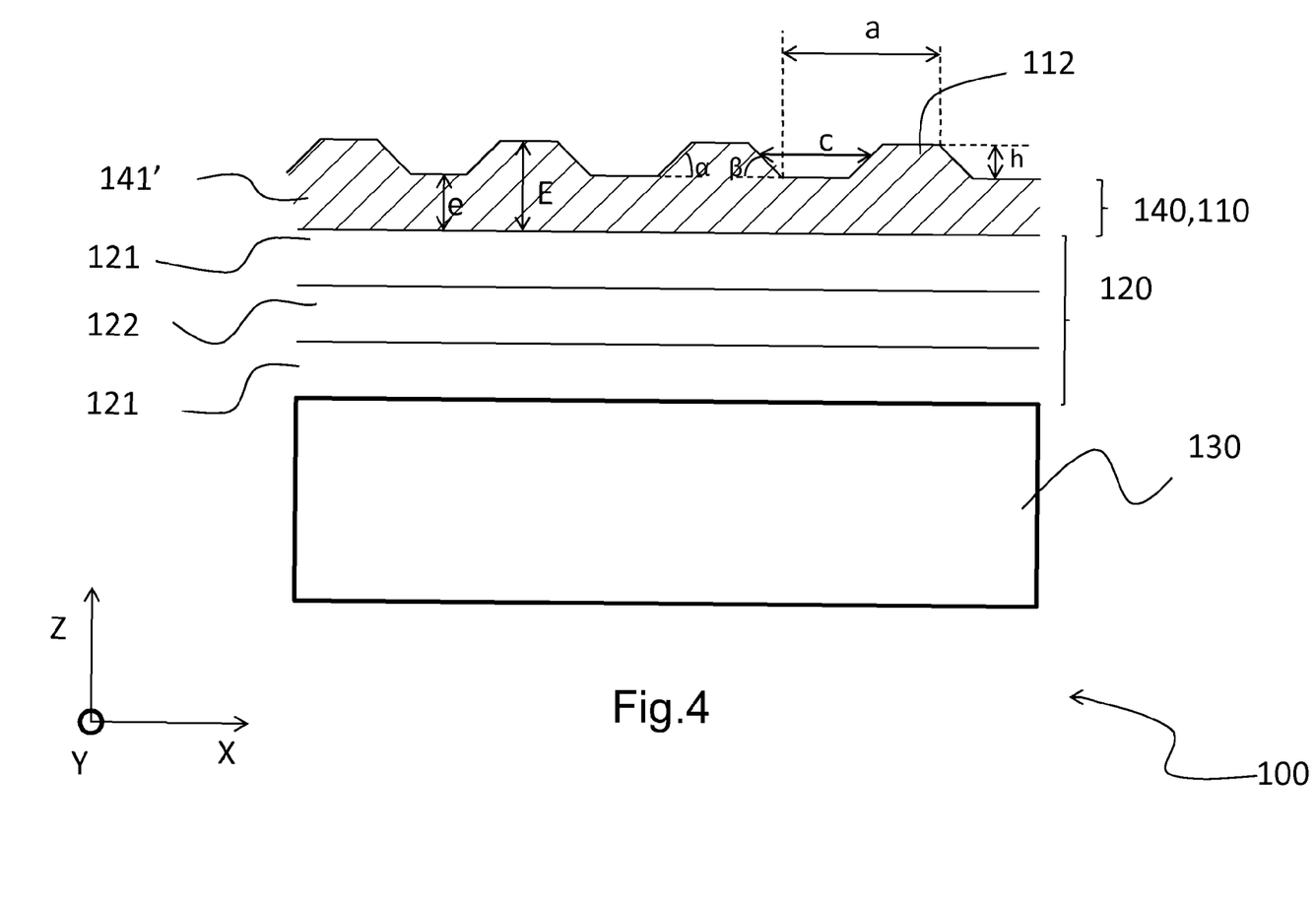
FIG. 4 is a schematic cross-section view of an optical device for reflective diffraction according to a second embodiment of the invention.

FIG. 4 represents the optical device for reflective diffraction 100 according to the second embodiment of the invention.

In this embodiment diffraction grating 110 is integrated in protective structure 140. More specifically, a periodic arrangement of patterns 112 is etched in mixture layer 141' which is the first layer of the protective structure reached by an incident light ray.

This embodiment fully exploits the use of a mixture layer 141' of protective structure 140, which has a high laser flux resistance.

The arrangement of patterns is as described above in relation with FIG. 2.

The advantage of this embodiment compared to the first embodiment is that it eliminates the interface between a dielectric layer made of $SiO_2$ in which a diffraction grating is etched and the protective structure, particularly since the modulus of the electric field is generally high at the interface between an etched dielectric layer and a thin layer directly underlying this layer.

The global damage threshold of device 100 is consequently improved thereby, and the spatial profile of the pulse is less degraded, since there are fewer stresses which lead to the deformation of the surface of the diffraction grating.

Mixture layer 141' of protective structure 140 in which diffraction grating 110 is etched is deposited on a single-material thin layer made of SiO2 of reflecting structure 120.

To maximise the reflection efficiency, mixture layer 141' has an optical index which is higher than that of single-material layer 121 made of $SiO_2$.

Mixture layer 141 is preferably made such that the mixture includes a proportion of $SiO_2$ at least equal to 5%, and consequently a proportion of $HfO_2$ at most equal to 95%.

Figure 5:
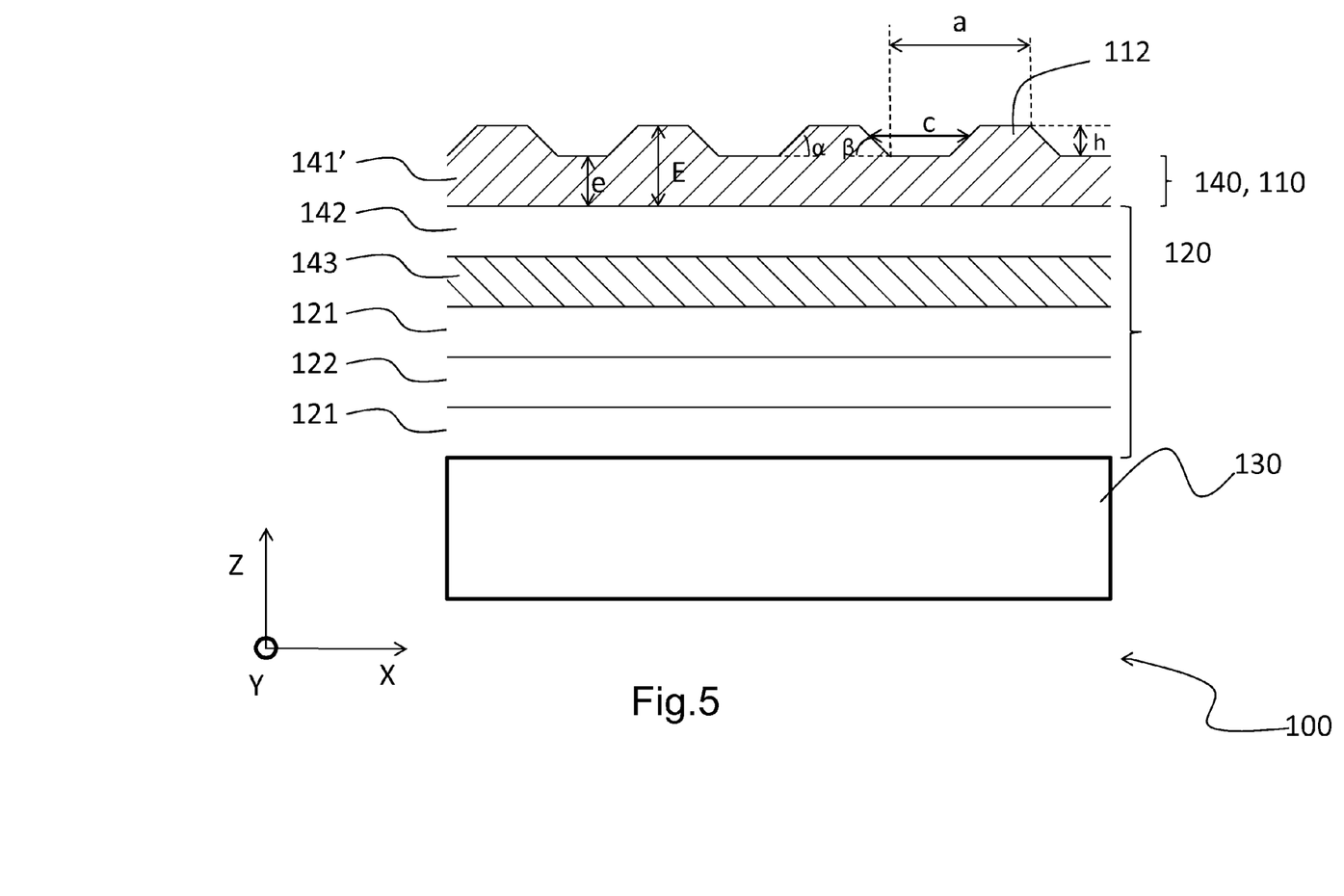
FIG. 5 is a schematic cross-section view of an optical device for reflective diffraction according to a variant of the second embodiment of the invention.

A variant of this second embodiment is illustrated in FIG. 5.

According to this variant, protective structure 140 includes, in addition to etched mixture layer 141' to form a diffraction grating 110, a dielectric intermediate thin layer 142 made of SiO2 and a second mixture layer 143 made by a uniform mixture of the said first and second dielectric materials. Dielectric intermediate layer 142 is inserted between first mixture layer 141' and second mixture layer 143 and second mixture layer 143 is deposited on a thin layer 121 made of $SiO_2$ of reflecting structure 120.

Single-material layers 121, 122 of reflecting structure 120 and the layers which comprise the protective structure 142, 143, except for first etched mixture layer 141', preferably all have roughly the same thickness.

To maximise the reflection efficiency, mixture layer 141' and mixture layer 143 have optical indices which are higher than that of single-material layer 121 made of $SiO_2$.

The mixture in layers 141' and 143 preferably includes a proportion of $SiO_2$ at least equal to 5%, and consequently a proportion of $HfO_2$ at most equal to 95%.

It is understood that, according to this variant of the second embodiment, the laser flux protection provided by protective structure 140 according to the invention is at once improved by the presence of a second mixture layer 143 having a high damage threshold and an optical index said to be high, but also by the presence of dielectric intermediate thin layer 142.

The variants of the first embodiment and the second embodiment of the invention have been described only in the case in which the protective structure has two mixture layers. It is self-evident that it is conceivable that the protective structure may have multiple mixture layers and, consequently, additional intermediate layers.

It is possible also, without going beyond the scope of the invention, that the proportion of the second dielectric material in the mixture layers can be strictly higher than that of the first dielectric material. In this manner, the mixture layers have an optical index close to that of a single-material layer made of HfO2 but with a much higher damage threshold.

The invention claimed is:

1. An optical device for reflective diffraction of an incident light beam, comprising:
a reflecting structure having a stack of thin dielectric layers made alternately of a first dielectric material and of a second dielectric material, the first dielectric material having an optical index lower than that of the second dielectric material,
a protective structure deposited on a thin dielectric layer made of the first dielectric material of the stack of the reflecting structure, the protective structure including at least a first mixture layer formed of a homogenous mixture of the first and second dielectric materials, the optical index of the first mixture layer being higher than that of the first dielectric material;
wherein the protective structure comprises exclusively said first mixture layer; and
wherein a periodic arrangement of patterns is etched on a free surface of the said protective structure, in said mixture layer, so as to form a diffraction grating.

2. An optical device for reflective diffraction of an incident light beam according to claim 1 wherein said first dielectric material is $SiO_2$.

3. An optical device for reflective diffraction of an incident light beam according to claim 2 wherein said second dielectric material is $HfO_2$.

4. An optical device for reflective diffraction of an incident light beam according to claim 3 wherein said first mixture layer contains at least 5% of $SiO_2$.

5. An optical device for reflective diffraction of an incident light beam according to claim 4 including a substrate on which the reflecting structure is disposed.

6. An optical device for reflective diffraction of an incident light beam according to claim 5 wherein said substrate is metallic.

7. An optical device for reflective diffraction of an incident light beam according to claim 5, including a layer of a metallic material, positioned between the said reflecting structure and the said substrate.

* * * * *